United States Patent
Gupta et al.

(10) Patent No.: US 10,169,527 B2
(45) Date of Patent: *Jan. 1, 2019

(54) ACCURATE STATISTICAL TIMING FOR BOUNDARY GATES OF HIERARCHICAL TIMING MODELS

(71) Applicant: International Business Machines Corporation, Armonk, NY (US)

(72) Inventors: Hemlata Gupta, Hopewell Junction, NY (US); Debjit Sinha, Wappingers Falls, NY (US); Chandramouli Visweswariah, Croton-on-Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,886

(22) Filed: Nov. 15, 2017

(65) Prior Publication Data

US 2018/0075183 A1 Mar. 15, 2018

Related U.S. Application Data

(63) Continuation of application No. 14/990,212, filed on Jan. 7, 2016, now Pat. No. 9,940,431.

(51) Int. Cl.
*G06F 17/50* (2006.01)
(52) U.S. Cl.
CPC ...... *G06F 17/5081* (2013.01); *G06F 17/5031* (2013.01); *G06F 2217/78* (2013.01); *G06F 2217/84* (2013.01)

(58) Field of Classification Search
CPC ............ G06F 17/5031; G06F 17/5059; G06F 17/5081; G06F 2217/84
USPC ........................................ 716/108, 113, 134
See application file for complete search history.

(56) References Cited

U.S. PATENT DOCUMENTS

2016/0314236 A1* 10/2016 Bhanji ............... G06F 17/5081
2017/0199956 A1 7/2017 Gupta

OTHER PUBLICATIONS

List of IBM Patents or Patent Applictions Treated as Related; (Appendix P), Filed Nov. 15, 2017, 2 pages.

* cited by examiner

*Primary Examiner* — Paul Dinh
(74) *Attorney, Agent, or Firm* — Cantor Colburn LLP; Steven Meyers (57) ABSTRACT

A system to improve performance of a semiconductor chip design includes a hierarchical analysis module that determines a hierarchical arrangement of the semiconductor chip design. The hierarchical arrangement includes a plurality of arcs located at different levels internal to the semiconductor chip design. The different levels include a macro level, a unit level and a core level. The system further includes a timing/load analysis module that determines first timing characteristics of at least one first arc in the macro level based on a first load applied to the at least one first arc. The system further determines second timing characteristics of at least one second arc in at least one of the unit level and the core level based on the first timing characteristics, with a portion of the second timing characteristics determined irrespective of the first load.

20 Claims, 5 Drawing Sheets

ACCURATE STATISTICAL TIMING FOR BOUNDARY GATES OF HIERARCHICAL TIMING MODELS

DOMESTIC PRIORITY

This application is a continuation of U.S. patent application Ser. No. 14/990,212, filed Jan. 7, 2016, the disclosure of which is incorporated by reference herein in its entirety.

BACKGROUND

The present invention relates to semiconductor chip fabrication, and more specifically, to semiconductor chip timing analysis and optimization.

Semiconductor chip fabrication typically includes benchmark tests which require the semiconductor chip to pass timing and/or frequency targets before proceeding to the manufacturing stage. To manage complexity and aid parallel development, various semiconductor chips (e.g., microprocessors) are designed according to a hierarchical scheme which includes, for example, a macro level, a unit level and a core level. Each macro/unit/core has a contract or timing specification that is expected to be satisfied.

The macro level comprises of a plurality of macro circuits including a plurality of logic gates connected to one another via at least one electrically conductive path. The unit level comprises at least one unit components including at least one macro circuit. The core level comprises one or more core components including at least one unit component. An input or output of a respective gate or respective wire at the macro level is typically referred to as a node, while a connection between different nodes (e.g., a first node and a second node) is typically referred to as an arc. That is, an arc indicates, for example, how a first node is connected to a second node.

When performing timing analysis of the macro level, conventional methods have relied on circuit simulation techniques which achieve high accuracy analysis results. These conventional circuit simulation techniques, however, tend to be run time prohibitive and thus may prove to be inefficient especially if multiple instances exist where portions of macro level, unit level and/or core level do not require timing analysis.

SUMMARY

According to a non-limiting embodiment, a system to improve performance of a semiconductor chip design includes a hierarchical analysis module that determines a hierarchical arrangement of the semiconductor chip design. The hierarchical arrangement includes a plurality of arcs located at different levels internal to the semiconductor chip design. The different levels include a macro level, a unit level and a core level. The system further includes a timing/load analysis module that determines first timing characteristics of at least one first arc in the macro level based on a first load applied to the at least one first arc. The system further determines second timing characteristics of at least one second arc in at least one of the unit level and the core level based on the first timing characteristics, with at least a portion of the second timing characteristics determined irrespective of the first load.

According to another non-limiting embodiment, a method of improving performance of a semiconductor chip design comprises determining a hierarchical arrangement of the semiconductor chip design. The hierarchical arrangement includes a plurality of arcs located at different levels internal to the semiconductor chip design, wherein the different levels include a macro level, a unit level and a core level. The method further includes determining first timing characteristics of at least one first arc in the macro level based on a first load applied to the at least one first arc. The method further includes determining second timing characteristics of at least one second arc in at least one of the unit level and the core level based on the first timing characteristics. At least a portion of the second timing characteristics is determined irrespective of the first load.

According to still another embodiment, a computer program product improves performance of a semiconductor chip design. The computer program product comprises a computer readable storage medium having program instructions embodied therewith. The program instructions are executable by an electronic computer processor to perform operations comprising determining a hierarchical arrangement of the semiconductor chip design. The hierarchical arrangement includes a plurality of arcs located at different levels internal to the semiconductor chip design. The different levels include a macro level, a unit level and a core level. The operations further include determining first timing characteristics of at least one first arc in the macro level based on a first load applied to the at least one first arc. The operations further include determining second timing characteristics of at least one second arc in at least one of the unit level and the core level based on the first timing characteristics. At least a portion of the second timing characteristics are determined irrespective of the first load.

Additional features are realized through the techniques of the present invention. Other embodiments are described in detail herein and are considered a part of the claimed invention. For a better understanding of the invention with the features, refer to the description and to the drawings.

DETAILED DESCRIPTION

Various non-limiting embodiments provide a system and method to improve performance of a semiconductor chip design. In at least one embodiment, a macro-modeling scheme, also referred to as an abstraction scheme, is performed which generates a simplified timing model of the various levels (e.g., macro level, unit level, core level) of the semiconductor chip. The simplified timing models may then be utilized to perform timing analysis at the next higher level with little to no loss in testing accuracy. For instance, a simplified macro timing model of the macro level may be generated, and then utilized to perform timing analysis of the higher unit level. Accordingly, the macro-modeling scheme provided by at least one non-limiting embodiment of the invention achieves orders of run-time saving with minimal accuracy loss.

Figure 1:
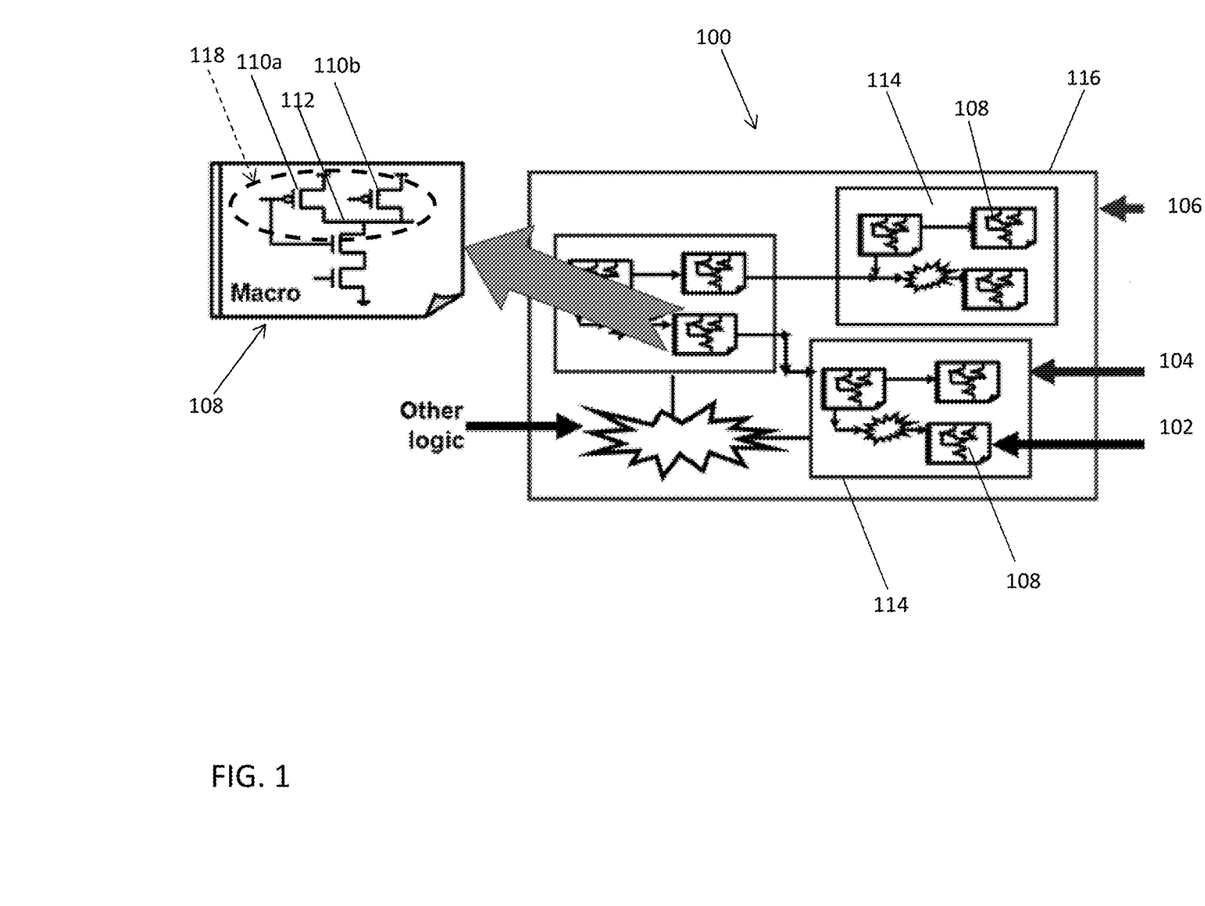
FIG. 1 illustrates a semiconductor chip subject to improved performance according to a macro-modeling scheme according to a non-limiting embodiment.

With reference now to FIG. 1, a semiconductor chip 100 is illustrated, which is subject to improved performance according to a macro-modeling scheme according to a non-limiting embodiment of the invention. The semiconductor chip 100 includes a Very-large-scale integration (VLSI) chip, for example, having a hierarchical arrangement. The hierarchical arrangement includes a plurality of arcs located at different levels internal to the chip 100. The different levels including a macro level 102, a unit level 104, and a core level 106. The macro level 102 comprises a plurality of macro circuits 108 including a plurality of logic gates 110 connected to one another via at least one electrically conductive path such as, for example, an electrically conductive wire or trace 112. The unit level 104 is formed at a higher level than the macro level 102 and comprises at least one unit components 114 including one or more macro circuit 108 The core level 106 comprises one or more core components 116 including at least one unit component 114. An input or output of a respective gate 110 or respective wire/trace 112 is defined as a node, and an arc 118 indicates a connection between a first node and a second node. Each arc 118 indicates how a first node is connected to a second node. For example, arc 118 indicates the connection between a first gate 110a and a second gate 110b via wire/trace 112.

Figure 2:
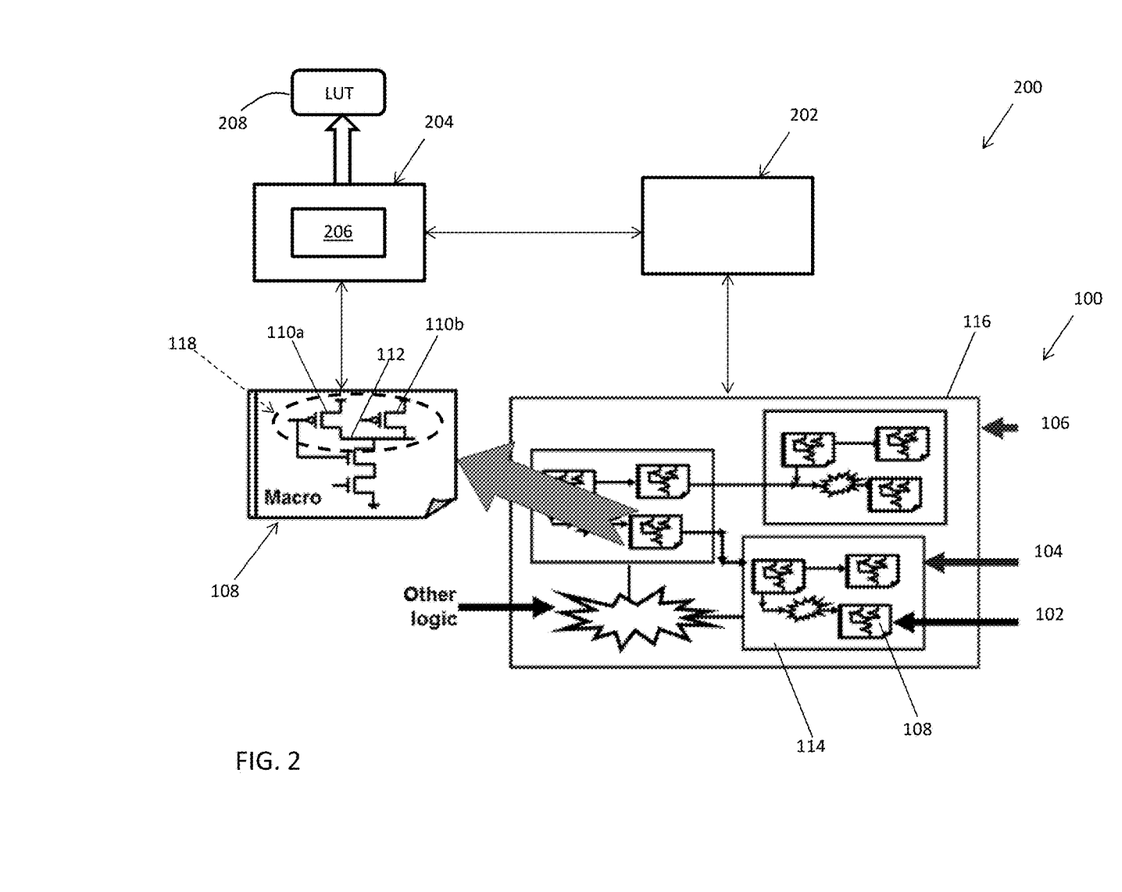
FIG. 2 illustrates a semiconductor optimization system configured to perform statistical timing analysis of boundary gates included in a semiconductor chip according to a non-limiting embodiment.

Turning now to FIG. 2, a semiconductor optimization system 200 configured to perform statistical timing analysis of boundary gates included in a semiconductor chip 100 is illustrated according to a non-limiting embodiment. The semiconductor optimization system 200 includes an electronic hierarchical analysis module 202 and an electronic timing/load analysis module 204. The hierarchical analysis module 202 is configured to be selectively signal connected to the chip 100 and includes an electronic hardware controller (e.g., a microcontroller) configured to determine a hierarchical arrangement of the semiconductor chip 100. The hierarchical arrangement includes a plurality of arcs 118 located at different levels internal to the semiconductor chip 100. The different levels include, for example, a macro level 102, a unit level 104 and a core level 106.

The timing/load analysis module 204 is in signal communication with the hierarchical analysis module 202, and to receive level information related to a particular level 102-106. The level information includes, but is not limited to, the number of levels of the chip 100, the components includes in each level 102-106, etc. For example, hierarchical analysis module 202 may inform the timing/load analysis module 204 as to the number of core components 116 existing at the core level 106, the number of unit components 114 included in each core component 116, the number of unit components 114 existing at the unit level 104, the number of macro circuits 108 included in each core component 114, etc.

The timing/load analysis module 204 includes an electronic hardware controller (e.g., a microcontroller) configured to determine first timing characteristics of at least one first arc 118 in the macro level 102. Based on the first timing characteristics determined at the macro level 102, and the timing/load analysis module 204 determines second timing characteristics of at least one second arc in a higher level of the chip, i.e., the unit level 104 and/or the core level 106. In at least one embodiment, the timing/load analysis module 204 further includes an electronic macro model module 206 configured to generate a macro timing model of the macro level 102 based on the first timing characteristics. In this manner, the timing/load analysis module 204 may determine the second timing characteristics of at least one second arc in at least one of the unit level 104 and/or the core level 106 based on the macro timing model of the macro level 102.

The timing/load analysis module 204 performs a macro-modeling scheme to determine the second timing characteristics. According to at least one non-limiting embodiment, the macro-modeling scheme is based on the load applied to a first arc 118 and an input voltage applied to the first arc 118. As part of the macro-modeling scheme, the timing characteristics of each device (e.g. gates 110a-110b) or load (e.g., wire/trace 112) in the design is captured as a look-up-table (LUT) 208.

Figure 3A:
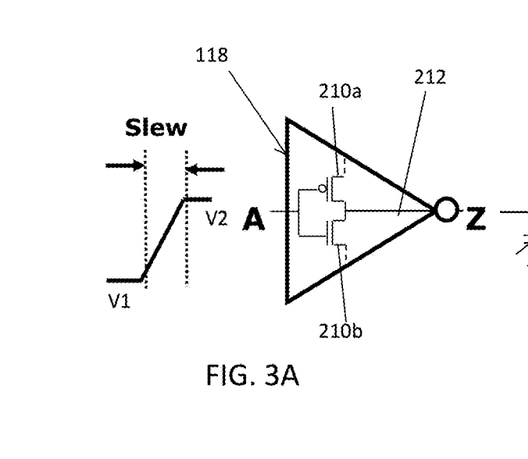
FIGS. 3A-3B illustrate the generation of a look-up table (LUT) populated according to various applied input voltage waveforms and output capacitive loadings.
Figure 3B:
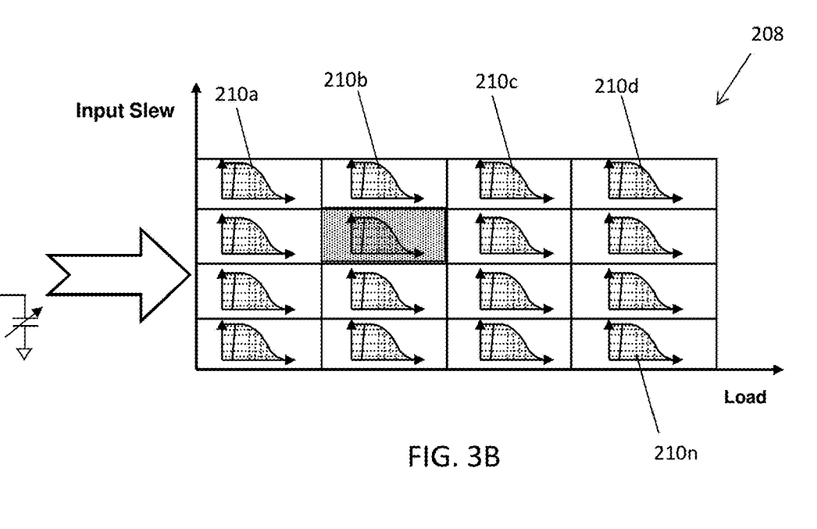

Turning to FIGS. 3A-3B, an arc (see FIG. 3A) is used to generate the LUT 208 (see FIG. 3B). The LUT 208 is populated according to various applied input voltage waveforms and output capacitive loadings. To keep table sizes manageable, input waveforms may be denoted using a slew metric, for example, which denotes the time the waveform takes to switch from 10% to 90%, for example, of the input voltage value. In at least one example, the input voltage is supplied as a sawtooth wave, sine-squared wave, or square wave such that the slew rate, which is delivered to the input (A) of an arc 118. The slew of the input voltage may be defined as the time at which the signal changes from a first voltage V1 (e.g., 0 Volts) to a second voltage V2 (e.g., 1 Volt). For each input slew and load, the LUT 208 is populated with information indicating the time duration needed for the switching signal at the input (A) of the arc 118 to produce a switching waveform at the output (Z) of this device (e.g. gate) and/or the waveform shape at the output. For example, the macro model module 206 generates a LUT 208 populated with at least one timing entry 210a-210n that indexes the input slew rate with respect to the load of a respective arc 118. For statistical macro-modeling, the populated at least one timing entry value 210a-210n is parameterized with sensitivities to process manufacturing, voltage, temperature (PVT) variability, etc.

According to at least one non-limiting embodiment, the macro-modeling performed by the timing/load analysis module 204 includes performing an internal gate characterization scheme and/or a boundary gate characterization scheme according to a static timing analysis (STA) and/or statistical static timing analysis (SSTA) to determine the second timing characteristics. The internal gate characterization scheme is performed, for example, in response to characterizing (i.e., modeling) a respective arc based on a varying slew rate irrespective of the load. The boundary gate characterization scheme, however, is performed in response to characterizing a respective arc based on a varying slew rate with respect to the load. In at least one embodiment, the boundary gate characterization scheme includes a scenario where one or more gates in an arc 118 realize a varying load. The internal gate characterization scheme and the boundary gate characterization scheme are each discussed in greater detail below.

Figure 4:
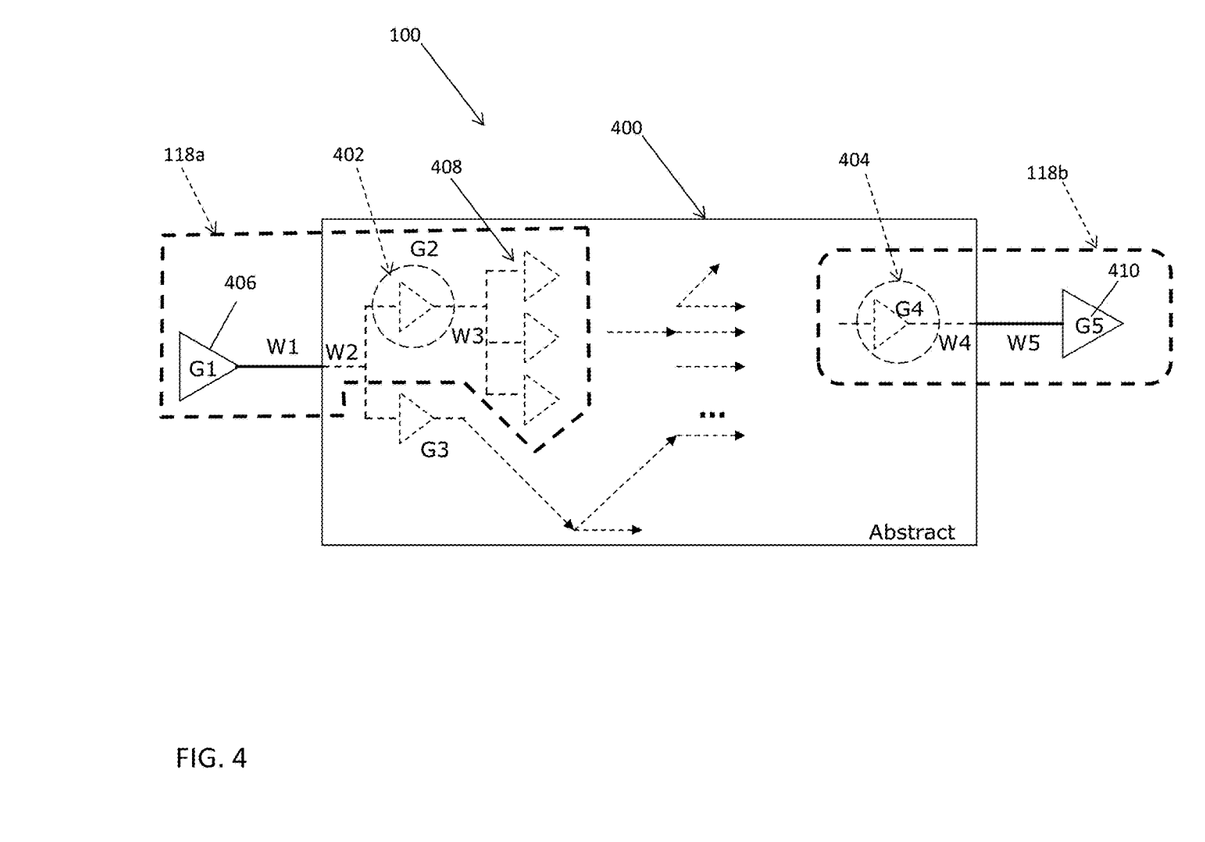
FIG. 4 illustrates a standard cell included at a first level of a semiconductor chip subject to macro-modeling (alternatively known as abstraction) according to a non-limiting embodiment.

Turning now to FIG. 4, a macro cell 400 included at a first level (e.g., macro level) of a semiconductor chip 100 subject to macro-modeling i.e., abstraction, is illustrated according to a non-limiting embodiment. The macro cell 400 includes one or more internal gates (e.g., 402) and one or more boundary gates (404). The internal gate 402 includes an input connected to a first external gate 406 via first and second wires/traces W1-W2, and an output connected to an internal load 408 via wire/trace W3. The external gate 406 delivers a variable input voltage to the internal gate 402. However, the internal load 408 is static or fixed, and is therefore known at all levels. Therefore, the input slew of the internal gate 402 is variable, while the load remains fixed in context such that there is no need to characterize the timing entry value as a function of the load. Accordingly, a macro-model may be generated to capture the delay/slew of the internal gate 402 as a function of the input slew only.

The boundary gate 404 includes an input that receives a variable input voltage and an output that is connected to an external load 410 (e.g., an external gate 410) via wires/traces W4-W5. Unlike the internal load 408, the external load 410 is subject to change due to varying external load at a higher level of hierarchy as well as due to statistical variability in the external load. Therefore, the boundary gate 404 is dependent on both the input slew applied to gate input and the variable output load. Since the load applied to the boundary gate 404 is not completely known out-of-context, (e.g., at each level of the chip 100), the internal context of the load is necessary so as to determine an accurate timing analysis of the cell 400. Traditional macro-modeling of boundary gate 404 involves characterization of the gate as a function of slew and load. The load in this case includes that of the internal wire W4 and different values applied at the end of wire W4. The load of wire W5 and external gate G5 are unknown during macro-modeling. However, statistical characterization using the partial wire W4 is inaccurate since at the time of statistical timing in-context using the macro-model, the timing value entry captured for gate 404 only contains the variability effects of wire W4. Incorporating the variability effects at this time for an external wire W5 is non-trivial. In addition, the variability information for the load from an external gate G5 cannot be accurately included. An accurate method is therefore required for accurate in-context statistical timing analysis of a boundary gate (for example, 404) inside a macro-model.

In one example, the boundary gate 404 may be macro-modeled (i.e., abstracted) by performing a complete statistical characterization of the gate segments without incorporating the load in wire W4. In this case, timing sensitivities are captured for every possible combination of slew and load variation realized by the boundary gate 404, wherein different load values are applied at the output of gate 404 instead of applying different loads at the output of wire W4. The load and its sensitivities of the wire W4 are ignored for the gate's characterization. In at least one embodiment, the timing sensitivities are determined based on slews and delays through the arc 118 of the boundary gate 404 as a function of the slew and load applied to the boundary gate 404 as described above. For each slew and load characterization point, the timing value entry's sensitivities to PVT variability is captured as a statistical timing value entry. The LUT is thus represented as a set of statistical timing value entries for different deterministic slews and loads.

In another example, macro-modeling (abstraction) of the boundary gate 404 may be performed without characterizing load-dependent gate segments. In this case, deterministic gate library characterization using various PVT tables obtained from the original rules of the load-dependent gate segments are retained as is. Alternately, the original rules may be obtained in statistical form (for example, a statistical standard-cell library model like S-ECSM). In this manner, repeated STA calculations as part of characterization on load-dependent gate segments is avoided, thereby reducing the overall number of statistical characterization processes performed to macro-model the cell 400.

Another example includes maintaining pointers or references to the original cell 404 and/or its original timing rules. This avoids capturing any characterization data for cell 404 explicitly during macro-modeling, and is potentially the most efficient. Each of the above three examples, however, do not include characterization of the internal wire W4. For statistical timing in context, however, the load information of wire W4 is needed in order to combine with external loads from wire W5 and gate G5. Boundary wire information must therefore be captured during macro-modeling.

Figure 5:
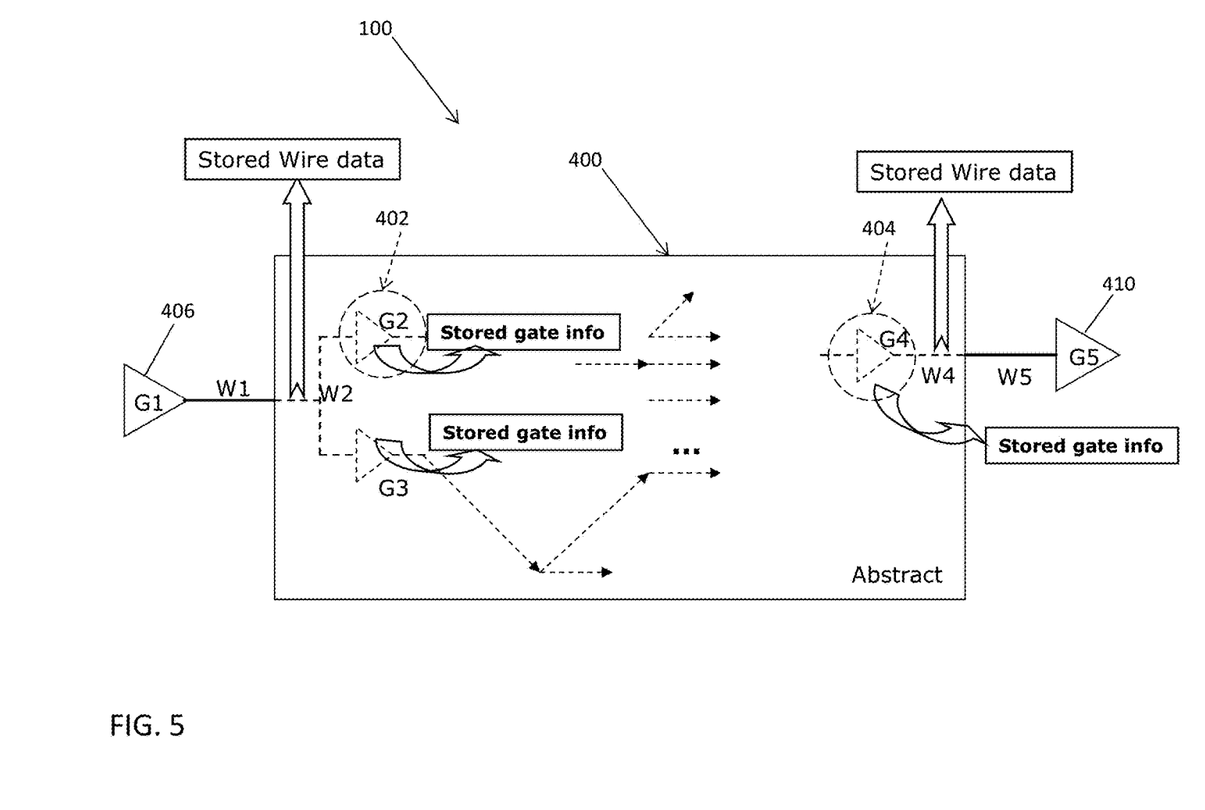
FIG. 5 illustrates a macro-modeling process taking into account variable load-dependent gate included in the cell of FIG. 4 according to a non-limiting embodiment.

Turning to FIG. 5, for example, macro-modeling of the cell 400 preserves wiring data of the wires/traces that are connected directly to the varying input and/or output of the gates 402-404. For instance, wire information of wire W2 is preserved since it delivers a variable voltage to the internal gate 402. Likewise, wire information of wire W4 is preserved since it is connected to the variable load applied by the external gate G5 (shown as 410). The wire information includes, for example, resistance-capacitance (RC) parasitic data, inductance, length, material, gauge, thickness, etc. Since the previous internal load (see FIG. 4, 408) is fixed, the load information for the internal load 408 may be discarded. In addition to the wire information, gate information may be stored for each gate connected to a wire subject to preserved wire information. Thereafter, a full finite differencing process is performed on the load-dependent gate segments in context. Finite-differencing involves multiple deterministic calculations at different PVT and other variability (e.g. metal variability) corners, and subsequently combining the results to a statistical form. Accordingly, statistical timing analysis is performed for the boundary gate 404 in-context.

For instance, since wire information is preserved for wire W2 and wire W4, gate information is preserved for gates G2, G3 and G4. The gate information includes the connections of each gate (e.g., the input of gates G2 and G3 are connected to wire W2). On the input side, the gate information retained does not include information for the output connections. For example, the information that gate G2 feeds internal wire W3 need not be preserved. The main goal in retaining the input side information of an input gate like G2 is to obtain its statistical input pin capacitance (loading) in-context accurately. This is used during statistical timing of an external gate G1 and an external wire W1 in context, wherein the loading of G2, G3 and W2 are needed for both. On the output side of cell 400, the gate information for gate G4 indicates that the input is connected to an internal source, while the output is connected to wire W5.

Various non-limiting embodiments described above provide a system and method to improve performance of a semiconductor chip design. In at least one embodiment, a macro-modeling (i.e., abstraction) scheme or abstraction scheme is performed which generates a simplified timing model of the various levels (e.g., macro level, unit level, core level) of the semiconductor chip. The simplified timing models may then be utilized to perform timing analysis at the next higher level with little to no loss in testing accuracy. For instance, a simplified macro timing model of the macro level may be generated, and then utilized to perform timing analysis of the higher unit level.

In at least one embodiment, macro-modeling of variable load-dependent gates are performed a first level (e.g., macro level) of the chip and preserved, while fixed internal load information is discarded. When macro-modeling a higher level (e.g., unit level) of the chip, the preserved wire information and gate information is utilized, while the fixed internal load information local to the lower level is disregarded. Accordingly, the macro-modeling scheme provided by at least one non-limiting embodiment of the invention achieves orders of run-time saving with minimal accuracy loss.

As used herein, the term "module" refers to an application specific integrated circuit (ASIC), an electronic circuit, an electronic computer processor (shared, dedicated, or group) and memory that executes one or more software or firmware programs, a combinational logic circuit, a microcontroller, and/or other suitable components that provide the described functionality. When implemented in software, a module can be embodied in memory as a non-transitory machine-readable storage medium readable by a processing circuit and storing instructions for execution by the processing circuit for performing a method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of improving performance of a semiconductor chip design, the method comprising:
    determining, by a computer processor, a hierarchical arrangement of the semiconductor chip design, the hierarchical arrangement including a plurality of arcs located at different levels internal to the semiconductor chip design, wherein the different levels include a macro level, a unit level and a core level;
    determining, by the computer processor, first timing characteristics of at least one first arc in the macro level based on a load applied to the at least one first arc; and
    determining, by the computer processor, second timing characteristics of at least one second arc in at least one of the unit level and the core level based on the first timing characteristics, wherein a portion of the second timing characteristics is determined irrespective of the load,
    wherein the load includes a first capacitance load applied to the output of at least one first arc and a second capacitance load applied to an output of the at least one second arc, and
    wherein an input slew rate is implemented in the semiconductor design and the semiconductor chip design is provided for semiconductor chip fabrication.

2. The method of claim 1, further comprising generating a macro timing model of the macro level based on the first timing characteristics.

3. The method of claim 2, further comprising determining second timing characteristics of at least one second arc in at least one of the unit level and the core level based on the macro timing model.

4. The method of claim 1, further comprising determining the second timing characteristics based on at least one of a load applied to the at least one first arc and an input voltage applied to the at least one first arc.

5. The method of claim 4, wherein an input voltage applied to the at least one first arc changes from a first voltage level to a second voltage level to define the input slew rate.

6. The method of claim 5, further comprising determining the second timing characteristics according to an internal gate characterization scheme in response to characterizing a respective arc based on a varying slew rate irrespective of the load.

7. The method of claim 5, further comprising determining the second timing characteristics according to a boundary gate characterization scheme in response to characterizing a respective arc based on a varying slew rate with respect to the load.

8. The method of claim 1, further comprising determining original rules of load-dependent gate segments, and determining the second timing characteristics according to a boundary gate characterization scheme that is based on process manufacturing, voltage, temperature (PVT) tables generated according to the original rules.

9. The method of claim 1, further comprising determining at least one boundary gate included in a macro cell included in the macro level, and determining the second timing characteristics according to a boundary gate characterization scheme in response to maintaining at least one pointer that points to at least one of the macro cell, and original timing rules of the macro cell.

10. A system to improve performance of a semiconductor chip design, the system comprising:
    a hierarchical analysis module including a hardware controller configured to determine a hierarchical arrangement of the semiconductor chip design, the hierarchical arrangement including a plurality of arcs located at different levels internal to the semiconductor chip design, wherein the different levels include a macro level, a unit level and a core level; and
    a timing/load analysis module including a hardware controller configured to determine first timing characteristics of at least one first arc in the macro level based on a load applied to the at least one first arc, and to determine second timing characteristics of at least one second arc in at least one of the unit level and the core level based on the first timing characteristics, wherein a portion of the second timing characteristics is determined irrespective of the load,
    wherein the load includes a first capacitance load applied to an output of the at least one first arc and a second capacitance load applied to an output of the at least one second arc, and
    wherein an input slew rate is implemented in the semiconductor design and the semiconductor chip design is provided for semiconductor chip fabrication.

11. The system of claim 10, further comprising a macro model module configured to generate a macro timing model of the macro level based on the first timing characteristics.

12. The system of claim 11 wherein the timing/load analysis module includes a hardware controller configured to determine second timing characteristics of at least one second arc in at least one of the unit level and the core level based on the macro timing model.

13. The system of claim 10, wherein determining the second timing characteristics is based on at least one of a load applied to the at least one first arc and an input voltage applied to the at least one first arc.

14. The system of claim 13, wherein the input voltage changes from a first voltage level to a second voltage level to define an input slew rate.

15. The system of claim 14, wherein the second timing characteristics are determined in response to performing both an internal gate characterization scheme and a boundary gate characterization scheme, the internal gate characterization scheme characterizing a respective arc based on a varying slew rate irrespective of the load, and the boundary gate characterization scheme characterizing a respective arc based on a varying slew rate with respect to the load.

16. The system of claim 10, wherein the second timing characteristics are based on original rules of load-dependent gate segments, and wherein the second timing characteristics are determined according to a boundary gate characterization scheme that is based on process manufacturing, voltage, temperature (PVT) tables generated according to the original rules.

17. The system of claim 10, wherein the second timing characteristics are determined in response to maintaining at least one pointer that points to at least one of a macro cell included in the macro level and original timing rules of the macro cell.

18. The system of claim 14, wherein the macro model module generates a look-up table (LUT) including at least one timing entry that indexes the input slew rate with respect to the load of a respective arc.

19. The system of claim 18, wherein each timing entry indicates a time duration at which a switching signal is generated at the output of the respective arc in response to applying the input voltage.

20. A computer program product to improve performance of a semiconductor chip design, the computer program product comprising a computer readable storage medium having program instructions embodied therewith, the program instructions executable by an electronic computer processor to perform operations comprising:

determining, by a computer processor, a hierarchical arrangement of the semiconductor chip design, the hierarchical arrangement including a plurality of arcs located at different levels internal to the semiconductor chip design, wherein the different levels include a macro level, a unit level and a core level;

determining, by the computer processor, first timing characteristics of at least one first arc in the macro level based on a load applied to the at least one first arc; and determining, by the computer processor, second timing characteristics of at least one second arc in at least one of the unit level and the core level based on the first timing characteristics, wherein a portion of the second timing characteristics is determined irrespective of the load, wherein the load includes a first capacitance load applied to the output of at least one first arc and a second capacitance load applied to an output of the at least one second arc, and wherein an input slew rate is implemented in the semiconductor design and the semiconductor chip design is provided for semiconductor chip fabrication.

* * * * *